(12) United States Patent
Zhang (10) Patent No.: US 9,930,667 B2
(45) Date of Patent: Mar. 27, 2018

(54) METHOD AND DEVICE FOR COMMUNICATION ON UNLICENSED SPECTRUM IN UE AND BASE STATION

(71) Applicant: SHANGHAI LANGBO COMMUNICATION TECHNOLOGY COMPANY LIMITED, Shanghai (CN)

(72) Inventor: XiaoBo Zhang, Shanghai (CN)

(73) Assignee: SHANGHAI LANGBO COMMUNICATION TECHNOLOGY COMPANY LTD, Shanghai (CN)

( * ) Notice: Subject to any disclaimer, the term of this patent is extended or adjusted under 35 U.S.C. 154(b) by 0 days.

(21) Appl. No.: 15/122,305

(22) PCT Filed: Mar. 9, 2015

(86) PCT No.: PCT/CN2015/073903
§ 371 (c)(1),
(2) Date: Aug. 29, 2016

(87) PCT Pub. No.: WO2015/135456
PCT Pub. Date: Sep. 17, 2015

(65) Prior Publication Data
US 2016/0374084 A1    Dec. 22, 2016

(30) Foreign Application Priority Data

Mar. 9, 2014  (CN) .......................... 2014 1 0084403

(51) Int. Cl.
*H04W 4/00* (2018.01)
*H04W 72/04* (2009.01)
(Continued)

(52) U.S. Cl.
CPC ....... *H04W 72/0453* (2013.01); *H04L 1/1812* (2013.01); *H04L 1/1893* (2013.01);
(Continued)

(58) Field of Classification Search
None
See application file for complete search history.

(56) References Cited

U.S. PATENT DOCUMENTS

| | | | |
|---|---|---|---|
| 2011/0038310 A1* | 2/2011 | Chmiel | ............... H04J 11/0069 370/328 |
| 2012/0230268 A1* | 9/2012 | Marinier | ............... H04W 88/06 370/329 |

(Continued)

FOREIGN PATENT DOCUMENTS

| | | |
|---|---|---|
| CN | 102577291 A | 7/2012 |
| WO | 2013131268 A1 | 9/2013 |

OTHER PUBLICATIONS

International Search Report dated Jun. 11, 2015 from International Patent Application No. PCT/CN2015/073903 filed Mar. 9, 2015.

*Primary Examiner* — Bob Phunkulh
(74) *Attorney, Agent, or Firm* — Perkins Coie LLP (57) ABSTRACT

The present disclosure provides a method and device for communication on unlicensed spectrum in a UE and a base station. In view of PUCCH resource waste and transmission delay increase that are caused by configuring too much unlicensed spectrum, in the present disclosure, logical information is configured so that PDSCHs transmitted through different sub-frames on different physical carriers form one logical carrier, and an HARQ operation is performed on the logical carrier. As an embodiment, HARQ_ACK resources are reserved according to the number of logical carriers currently configured, and a system uses dynamic signaling to indicate an index of an HARQ_ACK corresponding to a scheduled PDSCH in the reserved HARQ_ACK resources.

(Continued)

The solution provided in the present disclosure saves PUCCH resources and reduces the HARQ delay. Besides, the present disclosure reuses as much as possible the PUCCH resource allocation scheme and HARQ transmission scheme in the existing LTE, and has good compatibility.

16 Claims, 3 Drawing Sheets

(51) Int. Cl.
  *H04L 1/18* (2006.01)
  *H04W 16/14* (2009.01)
  *H04L 5/00* (2006.01)

(52) U.S. Cl.
  CPC .......... *H04L 1/1896* (2013.01); *H04L 5/0032* (2013.01); *H04L 5/0055* (2013.01); *H04L 5/0091* (2013.01); *H04W 16/14* (2013.01); *H04W 72/0406* (2013.01); *H04L 5/001* (2013.01); *H04L 5/0048* (2013.01)

(56) References Cited

U.S. PATENT DOCUMENTS

| | | | |
|---|---|---|---|
| 2012/0264468 | A1 | 10/2012 | Turtinen et al. |
| 2012/0281566 | A1* | 11/2012 | Pelletier .............. H04W 76/046 370/252 |
| 2012/0281594 | A1 | 11/2012 | Stewart et al. |
| 2014/0036818 | A1 | 2/2014 | Koskela et al. |
| 2014/0254509 | A1* | 9/2014 | Chen ...................... H04L 5/0058 370/329 |
| 2015/0098437 | A1* | 4/2015 | Chen ...................... H04W 16/14 370/330 |
| 2015/0245323 | A1* | 8/2015 | You ...................... H04W 72/042 370/329 |
| 2015/0245376 | A1* | 8/2015 | Bashar ...................... H04L 1/18 370/277 |

* cited by examiner

METHOD AND DEVICE FOR COMMUNICATION ON UNLICENSED SPECTRUM IN UE AND BASE STATION

CROSS-REFERENCE TO RELATED APPLICATION

This application is a U.S. National Phase application under 35 U.S.C. § 371 of International Application No. PCT/CN2015/073903, filed on Mar. 9, 2014, and claims benefit to Chinese Patent Application No. CN 201410084403.9, filed on Mar. 9, 2014, all of which is hereby incorporated by reference for all purposes. The International Application was published in China on Jun. 4, 2015 as WO2015078379 A1 under PCT Article 21 (2).

BACKGROUND

Technical Field

The present disclosure is related to an unlicensed spectrum communication scheme applied in the wireless communication system, and more particular to a method and device for communication on an unlicensed spectrum based on long term evolution (LTE).

Related Art

In the traditional LTE system of the 3rd Generation Partner Project (3GPP), data transmission only occurs on the licensed spectrum; however, with the sharp increase in the business volume, especially in some urban areas, the licensed spectrum may be difficult to meet the demand of the business volume. The sixth-second plenary of 3GPP RAN discusses a new research topic, i.e. the comprehensive research of the unlicensed spectrum (RP-132085). The main purpose is to research the non-standalone deployment of LTE on the unlicensed spectrum, wherein the so-called non-standalone means that the communication on the unlicensed spectrum is required to be associated with the service cell on the licensed spectrum. An intuitive approach is to reuse the carrier aggregation (CA) in existing system as far as possible, i.e. the service cell deployed on the licensed spectrum serves as the primary component carrier (PCC), and the service cell deployed on the unlicensed spectrum serves as the secondary component carrier (SCC).

In the traditional carrier aggregation, a user equipment (UE) is capable of being configured with the maximum of five downlink carriers at the same time, and on the maximum of five downlink carriers, the physical downlink shared channel (PDSCH) is simultaneously received and on the physical uplink control channel (PUCCH) of PCC, the hybrid automatic repeat request (HARQ) acknowledgement (HARQ_ACK) of the PDSCH on the downlink carrier is feedbacked. The feedbacked HARQ_ACK may use the PUCCH format 1b or the PUCCH format 3, wherein the format 1b combined with a channel selection technique is applied for a scene including two carrier and the HARQ_ACK bits not greater than 4, and the format 3 is capable of supporting the maximum of twenty HARQ_ACK bits.

For the unlicensed spectrum, considering the non-controllable/predictable of the interference level thereof, the UE may be configured with more downlink carriers, and simultaneously uses a manner of dynamical frequency selection (DFS) to select a part of downlink carriers from the configured downlink carriers (in a given sub frame) for the PDSCH transmission. Further, considering the bandwidth of the unlicensed spectrum is larger, for example an unlicensed spectrum with about 500 MHz is available near the carrier frequency of 5 GHz, the carrier number configured by the UE may be larger (much larger than five). The traditional PUCCH format 3 may not support all configured carrier feedback HARQ_ACK. Additionally, after using DFS, it may lead to the frequent discontinuous transmission on the same physical carrier, thereby increasing the interval of the HARQ re-transmission and increasing the transmission delay.

For the above problems, the present disclosure discloses a method and device for communication on an unlicensed spectrum.

SUMMARY

The present disclosure provides a method for communication on an unlicensed spectrum in a UE, wherein the method includes the following steps:

Step A: receiving a high layer signaling to obtain S and V, wherein the S is L configuration information, the V is N logical information, each of the configuration information includes a carrier index and a working frequency band, and each of the logical information includes at least one of the following:
a carrier logical index;
an antenna information, the antenna information including a transmission mode; and
a cross carrier information, the cross carrier information including a service cell index;

Step B: receiving a first downlink control information (DCI), the first DCI including a virtual index and a scheduling information; and Step C: receiving a first PDSCH from the working frequency band of a first configuration information in a given sub frame according to the scheduling information of the first DCI;

wherein the first DCI complies with a configuration of a first logical information, the first logical information is the logical information among the V with the carrier logical index being equal to the virtual index of the first DCI; all of the working frequency band of the S belong to the unlicensed spectrum, the L is a positive integer, the N is a positive integer not greater than L, and the first configuration information is one of the following:

Option 1: the configuration information among the S with the working frequency band including a transmission bandwidth of the first DCI; and Option 2: the configuration information among the S with the carrier index being equal to a physical index of the scheduling information of the first DCI.

In one embodiment, the configuration of the first logical information complied with the first DCI includes at least one of the following:
a transmission carrier of the first DCI is indicated by the cross carrier information of the first logical information;
a candidate format of the first DCI is indicated by the transmission mode of the first logical information; and
a candidate port for demodulation reference signal port of the first PDSCH is indicated by the transmission mode of the first logical information.

The character of the above aspect is that by way of using the logical information to identify the logical carrier, and the logical carrier is identified by determining whether the virtual index carried by the DCI equals to the carrier logical index of the corresponding logical information. The PDSCHs scheduled by the DCI carrying the same virtual index belong to the same logical carrier, and share the configuration of the corresponding logical information, such as the cross carrier information of the transmission mode.

In one embodiment, an activation/deactivation state of the configuration information of the V is set as an activation state by a media access control (MAC) signaling.

In one embodiment, the working frequency band includes a carrier center frequency and a carrier bandwidth. In another embodiment, the working frequency band includes a down frequency and an up frequency.

In one embodiment, the carrier logical index is a positive integer less than eight—using three bits to indicate the carrier logical index and 0 is assigned to the main service cell. The virtual index of the first DCI replaces the carrier indicator field (CIF) bits of the traditional DCI.

In one embodiment, the antenna information includes all or part of the information of AntennaInfo in LTE.

In one embodiment, the cross carrier information includes all or part of the information of crossCarrierSchedulingConfig in LTE.

In one embodiment, the high layer signaling is a radio resource control (RRC) signaling.

In one embodiment, whether the scheduling information of the first DCI includes the physical index is configured by the high layer signaling. If the scheduling information of the first DCI does not include the physical index, the first DCI may not perform the cross carrier scheduling, i.e. the first DCI is only capable of scheduling PDSCH of this carrier.

Specifically, according to an aspect of the present disclosure, the logical information includes the cross carrier information, the first DCI is transmitted on a downlink resource of the service cell identified by the cross carrier information of the first logical information, and the first configuration information is Option 2.

The service cell is deployed on a licensed spectrum, and the downlink resource is a downlink carrier of FDD or a downlink sub frame of TDD.

Specifically, according to an aspect of the present disclosure, the N is 1.

Specifically, according to an aspect of the present disclosure, the configuration information further includes at least one of the following:
  a cell physical identification, the cell physical indicator is a positive integer from 0 t0 503;
  a reference signal configuration information; and
  a PDSCH configuration information.

In one embodiment, the cell physical identifier is used to a descrambling operation for the PDSCH received on the working bandwidth of the corresponding configuration information.

In one embodiment, the reference signal configuration information is all or part of information of csi-RS-Config-r10 of LTE. In another embodiment, the PDSCH configuration information includes a parameter related to the transmitting power, such as the energy per resource element (EPRE).

Specifically, according to an aspect of the present disclosure, the V shares the same transmission mode.

In one embodiment, the antenna information of the N logical information is configured by a common information element (IE) or is predetermined.

Specifically, according to an aspect of the present disclosure, the method further includes the following step:
  Step D: if the first PDSCH is re-transmission, performing a HARQ combination for the first PDSCH;
  wherein the virtual index of the DCI scheduling the PDSCH and the virtual index of the first DCI are the same, and the PDSCH and the first PDSCH are combined by performing the HARQ combination.

The character of the above aspect is that the downlink HARQ combination is performed in the logical carrier identified by the logical information. Thus, the delay of HARQ resulted by introducing the DFS is decreased.

Specifically, according to an aspect of the present disclosure, the HARQ combination reuses the LTE combination scheme, and the LTE combination scheme assumes the PDSCH combined with the first PDSCH by using the HARQ combination is at a physical frequency band which is the same as the physical frequency band of the first PDSCH.

According the above aspect, the LTE combination scheme includes an interpretation of the HARQ information for the scheduling information of the first DCI (i.e. the selection of the combined PDSCH), and the HARQ combination decoding scheme, etc.

In one embodiment, the HARQ information includes a HARQ process number, a redundancy version (RV), and a new data indicator (NDI). Specifically, the interpretation of the HARQ information refers to 3GPP standard TS36.321.

Specifically, according to an aspect of the present disclosure, the method further includes the following step:
  Step E: transmitting a HARQ_ACK to indicate a receiving state of the PDSCH of the given sub frame;
  wherein an amount of the transmitting blocks indicated by the HARQ_ACK is determined by at least one condition as follows:
    the transmission mode(s) in the V; and
    the transmission mode of all the service cells of the UE configured on a licensed spectrum.

The character of the above aspect is that the HARQ_ACK bit for the PDSCH on the unlicensed spectrum is pre-reserved according to the transmission mode(s) in the V (rather than according to the information of the S), thereby decreasing the number of the pre-reserved HARQ_ACK bit. The ARQ_ACK may only be three states, i.e. ACK/NACK/DTX.

Specifically, according to the above aspect of the present disclosure, a PUCCH format and a bit number and a physical resource mapping for transmitting the HARQ_ACK are determined according to a LTE uplink ACK scheme, and the LTE uplink ACK scheme is based on the assumption that the UE is configured with one primary cell and X−1 secondary cells; the X−1 secondary cells includes X−1−N secondary cells deployed on a licensed spectrum and N secondary cells identified by the V.

In one embodiment of the above aspect, if the HARQ_ACK uses the PUCCH format 3, the HARQ_ACK is cascaded by X bit groups, and the X is the sum of the N and the number of the service sells configured for the UE on the licensed spectrum. Each of the bit groups indicates one of the following:
  a receiving state of PDSCH of the service cell configured on the licensed spectrum; and
  a receiving state of PDSCH of the logical carrier configured on the licensed spectrum, x-th bit group of the X bit groups indicates the receiving state of the logical carrier the first PDSCH belongs to, the x is a location index of the virtual index of the first DCI in a index set, and the index set is a set formed by the cell index(es) of the service cell configured to the UE on the licensed spectrum and the carrier logical index(es) in the V in an ascending order. For FDD, the bit number of x-th bit group is a maximum transmitting block number supported by the transmission mode of the first logical information. When the transmission mode is one of {1, 2, 5, 6, 7}, x-th bit group includes 1 bit, and when the transmission mode is one of {3, 4, 8, 9, 10}, x-th bit group includes 2 bits. For TDD, x-th bit group may further indicates the receiving state of other sub frames besides the given sub frame, if only the PDSCH in other sub frames and the first PDSCH belong to the same one logical carrier, i.e. the virtual index of the DCI scheduling the PDSCH in other sub frames and the virtual index of the first DCI are the same. The other sub frames refer to Table 10.1.3.1-1 in 3GPP standard TS36.211.

In one embodiment of the uplink ACK scheme of the LTE, if the X is greater than 2 and the HARQ_ACK is transmitted on a frequency division duplex (FDD) carrier, the HARQ_ACK is transmitted on the PUCCH of the format 3. If the HARQ_ACK is transmitted on a TDD carrier, whether the HARQ_ACK uses the PUCCH format 1b or the format 3 is configured by the high layer signaling.

In another embodiment of the LTE uplink ACK scheme, if the HARQ_ACK indicates three data blocks and the PUCCH format is format 1b combined with the channel selection, the HARQ_ACK transmits two bits b(0)b(1) on the PUCCH resource identified by $n_{PUCCH}^{(1,\tilde{p})}$, wherein $\tilde{p}$ is an antenna port index of the PUCCH, the first PUCCH is transmitted on two antenna ports, for the antenna port $\tilde{p}_0$, $n_{PUCCH}^{(1,\tilde{p}_0)} = n_{PUCCH}^{(1)}$, wherein $n_{PUCCH}^{(1)}$ is selected from 3 candidate PUCCH resources, the three candidate PUCCH resources are $n_{PUCCH,j}^{(1)}$, wherein $0 \leq j \leq 2$; for the antenna port $\tilde{p}_1$, $n_{PUCCH}^{(1,\tilde{p}_1)}$ is selected from 3 candidate PUCCH resources, the three candidate PUCCH resources is $n_{PUCCH,j}^{(1,\tilde{p}_1)}$, wherein $0 \leq j \leq 2$. $n_{PUCCH,j}^{(1)}$ is determined by the high layer signaling and a location of the control channel element scheduling the corresponding transmitting block, and $n_{PUCCH}^{(1,\tilde{p}_1)}$ is configured by the high layer signaling. The specific embodiment of the more detailed scheme in the LTE system refers to section 10.2.2.1 in 3GPP standard TS36.213. The mapping between $n_{PUCCH}^{(1,\tilde{p})}$ and the physical resource refers to section 5.4.3 in 3GPP standard TS36.211, and the channel coding of the HARQ_ACK refers to Section 5.2.3.1 of TS36.211.

The present disclosure provides a method for communication on an unlicensed spectrum in a base station, wherein the method includes the following steps:

Step A: transmitting a high layer signaling to indicate S and V, the S is L configuration information, the V is N logical information, each of the configuration information includes a carrier index and a working frequency band, and each of the logical information includes at least one of the following:
  a carrier logical index;
  an antenna information, the antenna information includes a transmission mode; and
  a cross carrier information, the cross carrier information includes a service cell index;

Step B: transmitting a first DCI, the first DCI including a virtual index and a scheduling information; and Step C: transmitting a first PDSCH from the working frequency band of a first configuration information in a given sub frame according to the scheduling information of the first DCI;
  wherein the first DCI complies with a configuration of a first logical information, the first logical information is the logical information among the V with the carrier logical index being equal to the virtual index of the first DCI; all the working frequency bands of the S belong to the unlicensed spectrum, the L is a positive integer, the N is a positive integer not greater than L, and the first configuration information is one configuration information of the following:
  Option 1: the configuration information among the S with the working frequency band including a transmission bandwidth of the first DCI; and
  Option 2: the configuration information among the S with the carrier index being equal to a physical index of the scheduling information of the first DCI.

In one embodiment, an activation/deactivation state of the configuration information of the V is set as an activation state by a media access control (MAC) signaling.

Specifically, according to an aspect of the present disclosure, the carrier logical index is a positive integer less than eight.

Specifically, according to an aspect of the present disclosure, the logical information includes the cross carrier information, the first DCI is transmitted on a downlink resource of the service cell identified by the cross carrier information of the first logical information, and the first configuration information is Option 2.

Specifically, according to an aspect of the present disclosure, the N is 1.

Specifically, according to an aspect of the present disclosure, the configuration information further includes at least one of the following:
  a cell physical identification, the cell physical indicator is a positive integer from 0 to 503;
  a reference signal configuration information; and
  a PDSCH configuration information.

In one embodiment, the cell physical identifier is used for a scrambling operation of PDSCH transmitted on the working bandwidth of the corresponding configuration information.

Specifically, according to an aspect of the present disclosure, the V shares the same transmission mode.

Specifically, according to an aspect of the present disclosure, the step before the step C includes the following step:
  Step C0: if the first PDSCH is re-transmission, performing a HARQ coding for the first PDSCH, such that the first PDSCH and a target PDSCH can be combined by performing a HARQ combination;
  wherein the virtual index of the DCI scheduling the PDSCH and the virtual index of the first DCI are the same.

Specifically, according to the above aspect of the present disclosure, the HARQ combination reuses a LTE combination scheme, and the LTE combination scheme assumes the PDSCH combined with the first PDSCH by using the HARQ combination is at a physical frequency band which is the same as the physical frequency band of the first PDSCH.

The LTE combination scheme may include a configuration of the HARQ information for the scheduling information of the first DCI (i.e. the indication for combining the PDSCH) and the HARQ coding scheme (i.e. incremental redundancy or chase combing). In one embodiment, the HARQ information includes a HARQ process number, a redundancy version (RV), and a new data indicator (NDI). Specifically, the installation of the HARQ information refers to 3GPP standard TS36.321, and the HARQ coding scheme refers to 3GPP standard TS36.212.

Specifically, according to an aspect of the present disclosure, the method includes the following step:
  Step E: receiving a HARQ_ACK to obtain a receiving state of the PDSCH of the given sub frame;
  wherein an amount of the transmitting blocks indicated by the HARQ_ACK is determined by at least one condition as follows:

the transmission mode(s) in the V; and
the transmission mode(s) of all service cells of the UE is configured on a licensed spectrum.

Specifically, according to the above aspect of the present disclosure, a PUCCH format and a bit number and a physical resource mapping for transmitting the HARQ_ACK are determined according to a LTE uplink ACK scheme, and the LTE uplink ACK scheme is based on the assumption that the UE is configured with one primary cell and X−1 secondary cells; the X−1 secondary cells includes X−1−N secondary cells deployed on a licensed spectrum and N secondary cells identified by the V.

The present disclosure provides an user equipment, which includes:
a first module, for receiving a high layer signaling to obtain S and V, the S is L configuration information, the V is N logical information, each of the configuration information includes a carrier index and a working frequency band, and each of the logical information includes at least one of the following:
a carrier logical index;
an antenna information, the antenna information includes a transmission mode; and
a cross carrier information, the cross carrier information includes a service cell index;
a second module, for receiving a first DCI, the first DCI includes a virtual index and a scheduling information; and
a third module, for receiving a first PDSCH from the working frequency band of a first configuration information in a given sub frame according to the scheduling information of the first DCI;
wherein the first DCI complies with a configuration of a first logical information, the first logical information is that the carrier logical index of the V equals to one logical information of the virtual index of the first DCI; all the working frequency bands of the S belong to the unlicensed spectrum, the L is a positive integer, the N is a positive integer not greater than L, and the first configuration information is one configuration information of the following:
Option 1: the configuration information among the S with the working frequency band including a transmission bandwidth of the first DCI; and
Option 2: the configuration information among the S with the carrier index being equal to a physical index of the scheduling information of the first DCI.

In one embodiment, the user equipment further includes:
a fourth module, for performing a HARQ combination for the first PDSCH when the first PDSCH is re-transmission; and
a fifth module, for transmitting a HARQ_ACK to indicate a receiving state of the PDSCH of the given sub frame;
wherein the virtual index of the DCI scheduling the PDSCH and the virtual index of the first DCI are the same; an amount of the transmitting blocks indicated by the HARQ_ACK is determined by at least one condition as follows:
the transmission mode(s) in the V; and
the transmission mode(s) of all service cells of the UE is configured on a licensed spectrum.

The present disclosure provides a base station equipment, which includes:
a first module, for transmitting a high layer signaling to indicate S and V, wherein the S is L configuration information, the V is N logical information, each of the configuration information includes a carrier index and a working frequency band, and each of the logical information includes at least one of the following:

a carrier logical index;
an antenna information, the antenna information including a transmission mode; and
a cross carrier information, the cross carrier information including a service cell index;
a second module, for transmitting a first DCI, the first DCI including a virtual index and a scheduling information; and
a third module, for transmitting a first PDSCH from the working frequency band of a first configuration information in a given sub frame according to the scheduling information of the first DCI;
wherein the first DCI complies with a configuration of a first logical information, the first logical information is that the carrier logical index of the V equals to one logical information of the virtual index of the first DCI; all the working frequency bands of the S belong to the unlicensed spectrum, the L is a positive integer, the N is a positive integer not greater than L, and the first configuration information is one of the following:
Option 1: the configuration information among the S with the working frequency band including a transmission bandwidth of the first DCI; and
Option 2: the configuration information among the S with the carrier index being equal to a physical index of the scheduling information of the first DCI.

In one embodiment, the above equipment further includes:
a fourth module, for performing a HARQ coding for the first PDSCH, such that the first PDSCH and a target PDSCH can be combined by performing a HARQ combination when the first PDSCH is re-transmission; and
a fifth module, for receiving a HARQ_ACK to obtain a receiving state of the PDSCH of the given sub frame;
wherein the virtual index of the target DCI scheduling the PDSCH and the virtual index of the first DCI are the same; an amount of the transmitting blocks indicated by the HARQ_ACK is determined by at least one condition as follows:
the transmission mode(s) in the V; and
the transmission mode(s) of all service cells of the UE is configured on a licensed spectrum.

With regard to waste of the PUCCH resource and increase of the transmission delay arising from configuring excessive unlicensed spectrum, the present disclosure provides a method and device for communication on the unlicensed spectrum. The logical information is configured, such that the PDSCH transmitted by the different sub frames on the different physical carriers forms one logical carrier, so as to perform the HARQ operation for the logical carrier. In one embodiment, the HARQ_ACK resource is pre-reserved according to the current configured logical carrier number, the system indicates the index of the HARQ_ACK in the pre-reserved HARQ_ACK resource corresponding to the scheduled PDSCH through the dynamic signaling. The scheme of the present disclosure saves the PSCCH resource and decreases the HARQ delay. Furthermore, the present disclosure is capable of reusing the PUCCH resource allocation as much as possible and the HARQ transmission scheme in the existing LTE, and thus the compatibility is better.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
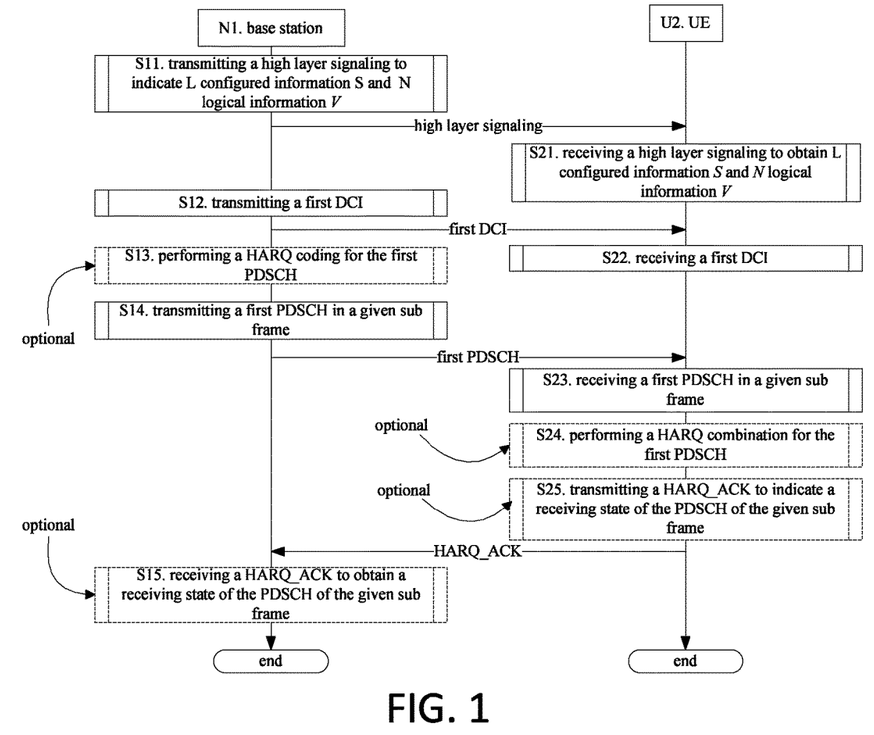
FIG. 1 is a flowchart of transmitting the downlink data on an unlicensed spectrum according to one embodiment of the present disclosure.

Embodiment I illustrates the flowchart of transmitting the downlink date on an unlicensed spectrum, as shown in FIG. 1. In FIG. 1, a base station N1 is a service base station of UE U2.

For the base station N1, in step S11, the method involves transmitting a high layer signaling to indicate S and V, wherein the S is L configuration information, the V is N logical information; in step S12, the method involves transmitting a first DCI; in step S14, the method involves transmitting a first PDSCH from the working frequency band of a first configuration information in a given sub frame according to the scheduling information of the first DCI.

For the UE U2, in step S21, the method involves receiving a high layer signaling to obtain S and V, wherein the S is L configuration information, the V is N logical information; in step S22, the method involves receiving a first DCI; in step S23, the method involves receiving a first PDSCH from the working frequency band of a first configuration information in a given sub frame according to the scheduling information of the first DCI.

In Embodiment I, each of the configuration information includes a carrier index and a working frequency band, each of the logical information includes at least one of the following:
  a carrier logical index;
  an antenna information, the antenna information including a transmission mode; and
  a cross carrier information, the cross carrier information including a service cell index.

The first DCI includes a virtual index and a scheduling information, the first DCI complies with a configuration of a first logical information, the first logical information is that the carrier logical index of the V equals to one logical information of the virtual index of the first DCI. All the working frequency bands of the S belong to the unlicensed spectrum, the L is a positive integer, the N is a positive interger not greater than L, and the first configuration information is one of the following:

Option 1: the configuration information among the S with the working frequency band including a transmission bandwidth of the first DCI; and Option 2: the configuration information among the S with the carrier index being equal to a physical index of the scheduling information of the first DCI.

In a sub embodiment 1 of Embodiment I, the logical information includes the cross carrier information, the first DCI is transmitted on a downlink resource of the service cell identified by the cross carrier information of the first logical information (the cell is maintained by the base station N1), and the first configuration information is the Option 2.

In a sub embodiment 2 of Embodiment I:

For the base station N1, in step S13, the method involves if the first PDSCH is re-transmission, performing a HARQ coding for the first PDSCH, such that the first PDSCH, and a target PDSCH can be combined by performing a HARQ combination. The virtual index of the target DCI scheduling the PDSCH and the virtual index of the first DCI are the same.

For the UE U2, in step S24, the method involves if the first PDSCH is re-transmission, performing a HARQ combination for the first PDSCH. The virtual index of the DCI scheduling the PDSCH and the virtual index of the first DCI are the same, and the PDSCH and the first PDSCH are combined by performing the HARQ combination.

In a sub embodiment 3 of Embodiment I:

For the base station N1, in step S15, the method involves receiving a HARQ_ACK to obtain a receiving state of the PDSCH of the given sub frame.

For the UE U2, in step S25, the method involves transmitting a HARQ_ACK to indicate a receiving state of the PDSCH of the given sub frame.

In the sub embodiment 3 of Embodiment I, an amount of the transmitting blocks indicated by the HARQ_ACK is determined as follows:
  the transmission mode(s) in the V; and
  the transmission mode of all the service cells of the UE is configured on a licensed spectrum.

Embodiment II

Figure 2:
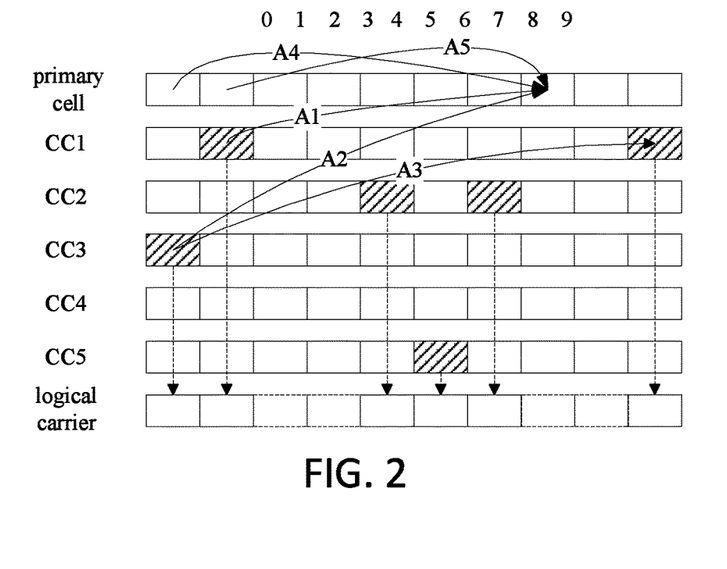
FIG. 2 is a schematic diagram illustrating a logical carrier according to one embodiment of the present disclosure.

Embodiment II is a schematic diagram illustrating a logical carrier, as shown in FIG. 2. In FIG. 2, the primary cell is deployed on the licensed spectrum, and the physical carriers CC1 to CC5 are deployed on the unlicensed spectrum. A small square indicates a time window length of one data bursting on the unlicensed spectrum.

For the base station, firstly, a high layer signaling is transmitted to indicate S and V, wherein S is five configuration information, and V is one configuration information; a first DCI is transmitted; a first PDSCH is received from the working frequency band of a first configuration information in a given sub frame according to the scheduling information of the first DCI.

For the UE, firstly, a high layer signaling is received to obtain S and V, wherein S is five configuration information, and V is one configuration information; a first DCI is received; a first PDSCH is transmitted from the working frequency band of a first configuration information in a given sub frame according to the scheduling information of the first DCI.

In Embodiment II, each of the configuration information includes a carrier index and a working frequency band, and further includes at least one of the following:
  a cell physical identification, the cell physical indicator is a positive integer from 0 to 503;

a reference signal configuration information; and
a PDSCH configuration information.

Each of the logical information includes at least one of the following:
- a carrier logical index;
- an antenna information, the antenna information including a transmission mode; and
- a cross carrier information, the cross carrier information including a service cell index.

The first DCI includes a virtual index and a scheduling information, the first DCI complies with a configuration of a first logical information, and the first logical information is that the carrier logical index of the V equals to one logical information of the virtual index of the first DCI. All the working frequency bands of the S belong to the unlicensed spectrum, the L is a positive integer, the N is a positive integer not greater than L, and the first configuration information is one of the following:

Option 1: the configuration information among the S with the working frequency band including a transmission bandwidth of the first DCI; and Option 2: the configuration information among the S with the carrier index being equal to a physical index of the scheduling information of the first DCI.

In FIG. 2, the first DCI is one sub frame in the time frequency resource identified by a slash, and on the square identified by the slash, the base station complies with the configuration of the first logical information to schedule the PDSCH of the UE (and the corresponding downlink DCI), thereby forming one logical carrier, as shown by the logical carrier in FIG. 2. A dotted line square indicates that the corresponding time window of the base station on the logical carrier without scheduling the UE.

In a sub embodiment 1 of Embodiment II:

In FIG. 2, one square indicates one sub frame, and the given sub frame is sub frame #9, i.e. the first PDSCH is located on the sub frame #9 of CC1. The first PDSCH is a re-transmission of PDSCH in sub frame #0 of CC3.

For the base station, a LTE combination scheme is used to perform a HARQ coding for the first PDSCH (as shown by an arrow A3), such that the first PDSCH may perform a HARQ combination with PDSCH of the sub frame #0 of CC3. The virtual index of PDSCH for scheduling the DCI of the sub frame #0 of CC3 is the same as the virtual index of the first DCI.

For the UE, a LTE combination scheme is used to perform a HARQ coding for the first PDSCH and the PDSCH of sub frame #0 of the CC3 (as shown by an arrow A3). The virtual index of PDSCH for scheduling the DCI of the sub frame #0 of CC3 is the same as the virtual index of the first DCI.

In a sub embodiment 2 of Embodiment II:

In FIG. 2, one square indicates one sub frame, and the given sub frame is sub frame #0, i.e. the first PDSCH is located on the sub frame #0 of CC3. The primary cell is TDD cell, and a reference uplink frame structure is TDDDL/UL frame structure #1.

For the base station, on the sub frame #7 of the primary cell, the first HARQ_ACK is received to obtain a receiving state of the PDSCH of the sub frame #0. For the UE, on the sub frame #7 of the primary cell, the first HARQ_ACK is transmitted to indicate a receiving state of PDSCH of the sub frame #0.

In the sub embodiment 2 of Embodiment II, an amount of the transmitting blocks indicated by the HARQ_ACK is determined as follows:

the transmission mode(s) in the V; and
the transmission mode(s) of all service cells of the UE is configured on a licensed spectrum.

In the sub embodiment 2 of Embodiment II, an amount of the transmitting blocks indicated by the HARQ_ACK is related to an amount of the downlink sub frame corresponding to the transmission sub frame of the first HARQ_ACK. According to the uplink ACK scheme of LTE, the HARQ_ACK of the sub frame #7 simultaneously indicates the receiving state of PDSCH of the sub frame #0 and the sub frame #1, i.e. the PDSCH of the sub frame #0 includes the first PDSCH (as shown by an arrow A2) and the PDSCH of the sub frame #0 of the primary cell. At the same, the first HARQ_ACK further indicates the PDSCH of the logical carrier of the sub frame #1 (as shown by an arrow A1) and the PDSCH of the sub frame #1 of the primary cell.

In a sub embodiment 3 of Embodiment II:

The first configuration information is Option 1, the first DCI does not include the physical index, and the first DCI and the first PDSCH are located on the same frequency band.

Embodiment III

Figure 3:
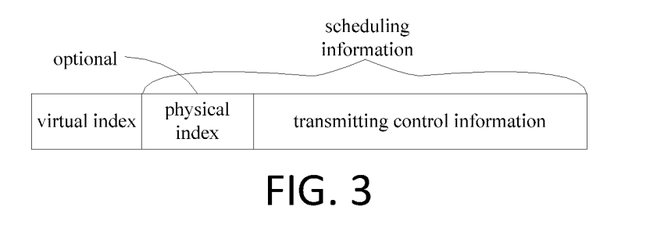
FIG. 3 is a schematic diagram illustrating a first DCI according to one embodiment of the present disclosure.

Embodiment III is a schematic diagram illustrating a first DCI, as shown in FIG. 3. In FIG. 3, the first DCI includes a virtual index, a physical index and a transmission control information, wherein the physical index is optional. A physical information (if exists) and the transmission control information are collectively called as a scheduling information.

The virtual index of the first DCI includes 3 bits, and a value range thereof is from one to seven. The bit number and the value range of the physical index may be configurable or may be predetermined. The bit number of the physical index is not less than $\log_2 L$, wherein the L is the amount of the physical carriers, configured by the UE on the current unlicensed spectrum, received by the first DCI (i.e. the quantity of the configuration information in the present disclosure).

In another sub embodiment of Embodiment III, the transmission control information includes all or part of information bits of the format 2C of the LTE DCI.

Embodiment IV

Figure 4:
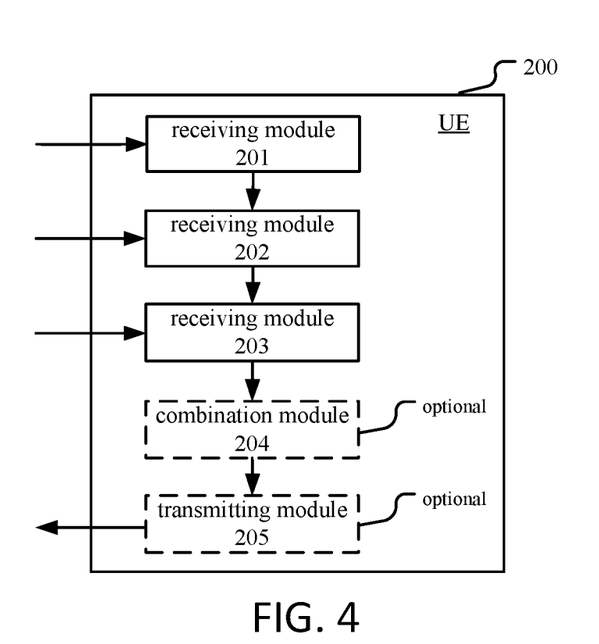
FIG. 4 is a schematic structure diagram illustrating a processing device in a UE according to one embodiment of the present disclosure.

Embodiment IV is a schematic structure diagram illustrating a processing device in a UE, as shown in FIG. 4. In FIG. 4, the processing device 200 in the UE mainly includes a receiving module 201, a receiving module 202, a receiving module 203, a combination module 204 and a transmitting module 205, wherein the combination module 204 and the transmitting module 205 are an optional module.

The receiving module 201 is used for receiving a high layer signaling to obtain S and V, wherein the S is L configuration information, the V is N logical information, each of the configuration information includes a carrier index and a working frequency band, and each of the logical information includes at least one of the following:
- a carrier logical index;
- an antenna information, the antenna information including a transmission mode; and
- a cross carrier information, the cross carrier information including a service cell index;

The receiving module 202 is used for receiving a first DCI, and the first DCI includes a virtual index and a scheduling information.

The receiving module 203 is used for receiving a first PDSCH from the working frequency band of a first configuration information in a given sub frame according to the scheduling information of the first DCI.

The combination module 204 is used for performing a HARQ combination for the first PDSCH if the first PDSCH is re-transmission.

The transmitting module 205 is used for transmitting a HARQ_ACK to indicate a receiving state of the PDSCH of the given sub frame.

In Embodiment IV, the first DCI complies with a configuration of a first logical information, and the first logical information is that the carrier logical index of the V equals to one logical information of the virtual index of the first DCI.

All the working frequency bands of the S belong to the unlicensed spectrum, the L is a positive integer, the N is a positive integer not greater than L, and the first configuration information is one of the following:

Option 1: the configuration information among the S with the working frequency band including a transmission bandwidth of the first DCI; and Option 2: the configuration information among the S with the carrier index being equal to a physical index of the scheduling information of the first DCI.

The virtual index of the DCI scheduling the PDSCH and the virtual index of the first DCI are the same, and the PDSCH and the first PDSCH are combined by performing the HARQ combination. An amount of the transmitting blocks indicated by the HARQ_ACK is determined by at least one condition as follows:

the transmission mode(s) in the V; and the transmission mode of all the service cells of the UE is configured on a licensed spectrum.

In a sub embodiment of Embodiment IV, the V shares the same transmission mode.

Embodiment V

Figure 5:
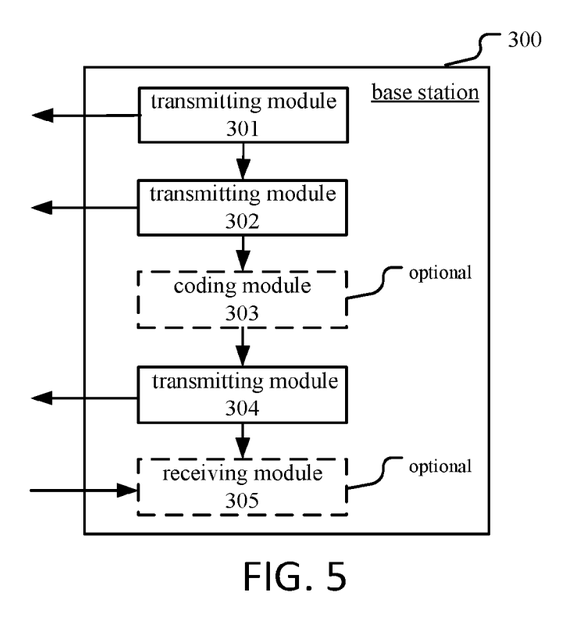
FIG. 5 is a schematic structure diagram illustrating a processing device in a base station according to one embodiment of the present disclosure.

Embodiment V is a schematic structure diagram illustrating a processing device in a base station, as shown in FIG. 5. In FIG. 5, the processing device 300 in the base station mainly includes a transmitting module 301, a transmitting module 302, a coding module 303, a transmitting module 304 and a receiving module 305, wherein the coding module 303 and the receiving module 305 are an optional module.

The transmitting module 301 is used for transmitting a high layer signaling to indicate S and V, the S is L configuration information, the V is N logical information, each of the configuration information includes a carrier index and a working frequency band, and each of the logical information includes at least one of the following:

a carrier logical index;

an antenna information, the antenna information includes a transmission mode; and a cross carrier information, the cross carrier information includes a service cell index;

The transmitting module 302 is used for transmitting a first DCI, and the first DCI includes a virtual index and a scheduling information; the coding module 303 is used for performing a HARQ coding for the first PDSCH, such that the first PDSCH and a target PDSCH can be combined by performing a HARQ combination when the first PDSCH is re-transmission; the transmitting module 304 is used for transmitting a first PDSCH from the working frequency band of a first configuration information in a given sub frame according to the scheduling information of the first DCI; the receiving module 305 is used for receiving a HARQ_ACK to obtain a receiving state of the PDSCH of the given sub frame.

In Embodiment V, the first DCI complies with a configuration of a first logical information, and the first logical information is that the carrier logical index of the V equals to one logical information of the virtual index of the first DCI.

All the working frequency bands of the S belong to the unlicensed spectrum, the L is a positive integer, the N is a positive integer not greater than L, and the first configuration information is one of the following:

Option 1: the configuration information among the S with the working frequency band including a transmission bandwidth of the first DCI; and Option 2: the configuration information among the S with the carrier index being equal to a physical index of the scheduling information of the first DCI.

The virtual index of the target PDSCH for scheduling the DCI and the virtual index of the first DCI are the same. An amount of the transmitting blocks indicated by the HARQ_ACK is determined by at least one condition as follows:

the transmission mode(s) in the V; and the transmission mode(s) of all service cells of the UE is configured on a licensed spectrum.

In a sub embodiment of Embodiment, the configuration information further includes at least one of the following:

a cell physical identification, the cell physical indicator is a positive integer from 0 to 503;

a reference signal configuration information; and a PDSCH configuration information.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for communication on an unlicensed spectrum in a UE, comprising:

receiving a high layer signaling to obtain S and V, wherein the S is L configuration information, the V is N logical information, each of the configuration information comprises a carrier index and a working frequency band, and each of the logical information comprises at least one of the following:

a carrier logical index;

an antenna information, the antenna information comprising a transmission mode; and a cross carrier information, the cross carrier information comprising a service cell index;

receiving a first DCI, the first DCI comprising a virtual index and a scheduling information; and receiving a first PDSCH from the working frequency band of a first configuration information in a given sub frame according to the scheduling information of the first DCI;

wherein the first DCI complies with a configuration of a first logical information, the first logical information is that the carrier logical index of the V equals to one logical information of the virtual index of the first DCI; all the working frequency bands of the S belong to the unlicensed spectrum, the L is a positive integer, the N is a positive integer not greater than L, and the first configuration information is one of the following:

the configuration information among the S with the working frequency band including a transmission bandwidth of the first DCI; and the configuration information among the S with the carrier index being equal to a physical index of the scheduling information of the first DCI.

2. The method according to claim 1, wherein the logical information comprises the cross carrier information, the first DCI is transmitted on a downlink resource of the service cell identified by the cross carrier information of the first logical information, and the first configuration information is the configuration information among the S with the carrier index being equal to a physical index of the scheduling information of the first DCI.

3. The method according to claim 1, wherein the carrier logical index is a positive integer less than eight, or the N is 1, or the V shares the same transmission mode, or the configuration information further comprises at least one of the following:

a cell physical identification, the cell physical indicator is a positive integer from 0 to 503;

a reference signal configuration information; and a PDSCH configuration.

4. The method according to claim 3, wherein the HARQ combination reuses a LTE combination scheme, and the LTE combination scheme assumes the PDSCH combined with the first PDSCH by using the HARQ combination is at a physical frequency band which is the same as the same physical frequency band of the first PDSCH.

5. The method according to claim 3, wherein a PUCCH format and a bit number and a physical resource mapping for transmitting the HARQ_ACK are determined according to a LTE uplink ACK scheme, and the LTE uplink ACK scheme is based on the assumption that the UE is configured with one primary cell and X−1 secondary cells; the X−1 secondary cells comprise X−1−N secondary cells deployed on a licensed spectrum and N secondary cells identified by the V.

6. The method according to claim 1, further comprising at least one of the following:

if the first PDSCH is re-transmission, performing a HARQ combination for the first PDSCH;

transmitting a HARQ_ACK to indicate a receiving state of the PDSCH of the given sub frame;

wherein the virtual index of the DCI scheduling the PDSCH and the virtual index of the first DCI are the same, and the PDSCH and the first PDSCH are combined by performing the HARQ combination;

wherein an amount of the transmitting blocks indicated by the HARQ_ACK is determined by at least one condition as follows:

the transmission mode(s) in the V; and the transmission mode of all the service cells of the UE is configured on a licensed spectrum.

7. A method for communication on an unlicensed spectrum in a base station, comprising:

transmitting a high layer signaling to indicate S and V, the S is L configuration information, the V is N logical information, each of the configuration information comprises a carrier index and a working frequency band, and each of the logical information comprises at least one of the following:

a carrier logical index;

an antenna information, the antenna information comprising a transmission mode; and a cross carrier information, the cross carrier information comprising a service cell index;

transmitting a first DCI, the first DCI comprising a virtual index and a scheduling information; and transmitting a first PDSCH from the working frequency band of a first configuration information in a given sub frame according to the scheduling information of the first DCI;

wherein the first DCI complies with a configuration of a first logical information, the first logical information is that the carrier logical index of the V equals to one logical information of the virtual index of the first DCI; all the working frequency bands of the S belong to the unlicensed spectrum, the L is a positive integer, the N is a positive integer not greater than L, and the first configuration information is one of the following:

the configuration information among the S with the working frequency band including a transmission bandwidth of the first DCI; and the configuration information among the S with the carrier index being equal to a physical index of the scheduling information of the first DCI.

8. The method according to claim 7, wherein the logical information comprises the cross carrier information, the first DCI is transmitted on a downlink resource of the service cell identified by the cross carrier information of the first logical information, and the first configuration information is the configuration information among the S with the carrier index being equal to a physical index of the scheduling information of the first DCI.

9. The method according to claim 7, wherein the carrier logical index is a positive integer less than eight, or the N is 1, or the V shares the same transmission mode, or the configuration information further comprises at least one of the following:

a cell physical identification, the cell physical indicator is a positive integer from 0 to 503;

a reference signal configuration information; and a PDSCH configuration information.

10. The method according to claim 7, wherein the step before the step C comprising transmitting a first PDSCH from the working frequency band of a first configuration information comprises at least one of the following:

if the first PDSCH is re-transmission, performing a HARQ coding for the first PDSCH, such that the first PDSCH and a target PDSCH can be combined by performing a HARQ combination;

receiving a HARQ_ACK to obtain a receiving state of the PDSCH of the given sub frame;

wherein the virtual index of the target DCI scheduling the PDSCH and the virtual index of the first DCI are the same; wherein an amount of the transmitting blocks indicated by the HARQ_ACK is determined by at least one condition as follows:

the transmission mode(s) in the V; and the transmission mode(s) of all service cells of the UE is configured on a licensed spectrum.

11. The method according to claim 10, wherein the HARQ combination reuses a LTE combination scheme, and the LTE combination scheme assumes the PDSCH combined with the first PDSCH by using the HARQ combination is at a physical frequency band which is the same as the physical frequency band of the first PDSCH.

12. The method according to claim 7, wherein a PUCCH format and a bit number and a physical resource mapping for transmitting the HARQ_ACK are determined according to a LTE uplink ACK scheme, and the LTE uplink ACK scheme is based on the assumption that the UE is configured with one primary cell and X−1 secondary cells; the X−1 secondary cells comprise X−1−N secondary cells deployed on a licensed spectrum and N secondary cells identified by the V.

13. An user equipment, comprising:
a first module, for receiving a high layer signaling to obtain S and V, the S is L configuration information, wherein the V is N logical information, each of the configuration information comprises a carrier index and a working frequency band, and each of the logical information comprises at least one of the following:
a carrier logical index;
an antenna information, the antenna information comprising a transmission mode; and
a cross carrier information, the cross carrier information comprising a service cell index;
a second module, for receiving a first DCI, the first DCI comprising a virtual index and a scheduling information; and
a third module, for receiving a first PDSCH from the working frequency band of a first configuration information in a given sub frame according to the scheduling information of the first DCI;
wherein the first DCI complies with a configuration of a first logical information, the first logical information is that the carrier logical index of the V equals to one logical information of the virtual index of the first DCI; all the working frequency bands of the S belong to the unlicensed spectrum, the L is a positive integer, the N is a positive integer not greater than L, and the first configuration information is one of the following:
the configuration information among the S with the working frequency band including a transmission bandwidth of the first DCI; and
the configuration information among the S with the carrier index being equal to a physical index of the scheduling information of the first DCI.

14. The equipment according to claim 13, further comprising:
a fourth module, for performing a HARQ combination for the first PDSCH when the first PDSCH is re-transmission; and
a fifth module, for transmitting a HARQ_ACK to indicate a receiving state of the PDSCH of the given sub frame;
wherein the virtual index of the DCI scheduling the PDSCH and the virtual index of the first DCI are the same; an amount of the transmitting blocks indicated by the HARQ_ACK is determined by at least one condition as follows:
the transmission mode(s) in the V; and
the transmission mode(s) of all service cells of the UE is configured on a licensed spectrum.

15. A base station equipment, comprising:
a first module, for transmitting a high layer signaling to indicate S and V, the S is L configuration information, wherein the V is N logical information, each of the configuration information comprises a carrier index and a working frequency band, and each of the logical information comprises at least one of the following:
a carrier logical index;
an antenna information, the antenna information comprising a transmission mode; and
a cross carrier information, the cross carrier information comprising a service cell index;
a second module, for transmitting a first DCI, the first DCI comprises a virtual index and a scheduling information; and
a third module, for transmitting a first PDSCH from the working frequency band of a first configuration information in a given sub frame according to the scheduling information of the first DCI;
wherein the first DCI complies with a configuration of a first logical information, the first logical information is that the carrier logical index of the V equals to one logical information of the virtual index of the first DCI; all the working frequency bands of the S belong to the unlicensed spectrum, the L is a positive integer, the N is a positive integer not greater than L, and the first configuration information is one of the following:
the configuration information among the S with the working frequency band including a transmission bandwidth of the first DCI; and
the configuration information among the S with the carrier index being equal to a physical index of the scheduling information of the first DCI.

16. The equipment according to claim 15, further comprising:
a fourth module, for performing a HARQ coding for the first PDSCH, such that the first PDSCH and a target PDSCH can be combined by performing a HARQ combination when the first PDSCH is re-transmission; and
a fifth module, for receiving a HARQ_ACK to obtain a receiving state of the PDSCH of the given sub frame;
wherein the virtual index of the target PDSCH for scheduling the DCI and the virtual index of the first DCI are the same; an amount of the transmitting blocks indicated by the HARQ_ACK is determined by at least one condition as follows:
the transmission mode(s) in the V; and
the transmission mode(s) of all service cells of the UE is configured on a licensed spectrum.

* * * * *

UNITED STATES PATENT AND TRADEMARK OFFICE
CERTIFICATE OF CORRECTION

PATENT NO. : 9,930,667 B2
APPLICATION NO. : 15/122305
DATED : March 27, 2018
INVENTOR(S) : XiaoBo Zhang Page 1 of 1

It is certified that error appears in the above-identified patent and that said Letters Patent is hereby corrected as shown below:

In the Claims

In Claim 2, Column 15, Line 25, after the word "to", delete "a" and insert therefore --the--.
In Claim 8, Column 16, Line 39, after the word "to", delete "a" and insert therefore --the--.

Signed and Sealed this
Sixth Day of October, 2020

Andrei Iancu
*Director of the United States Patent and Trademark Office*